United States Patent Office 3,489,959
Patented Jan. 13, 1970

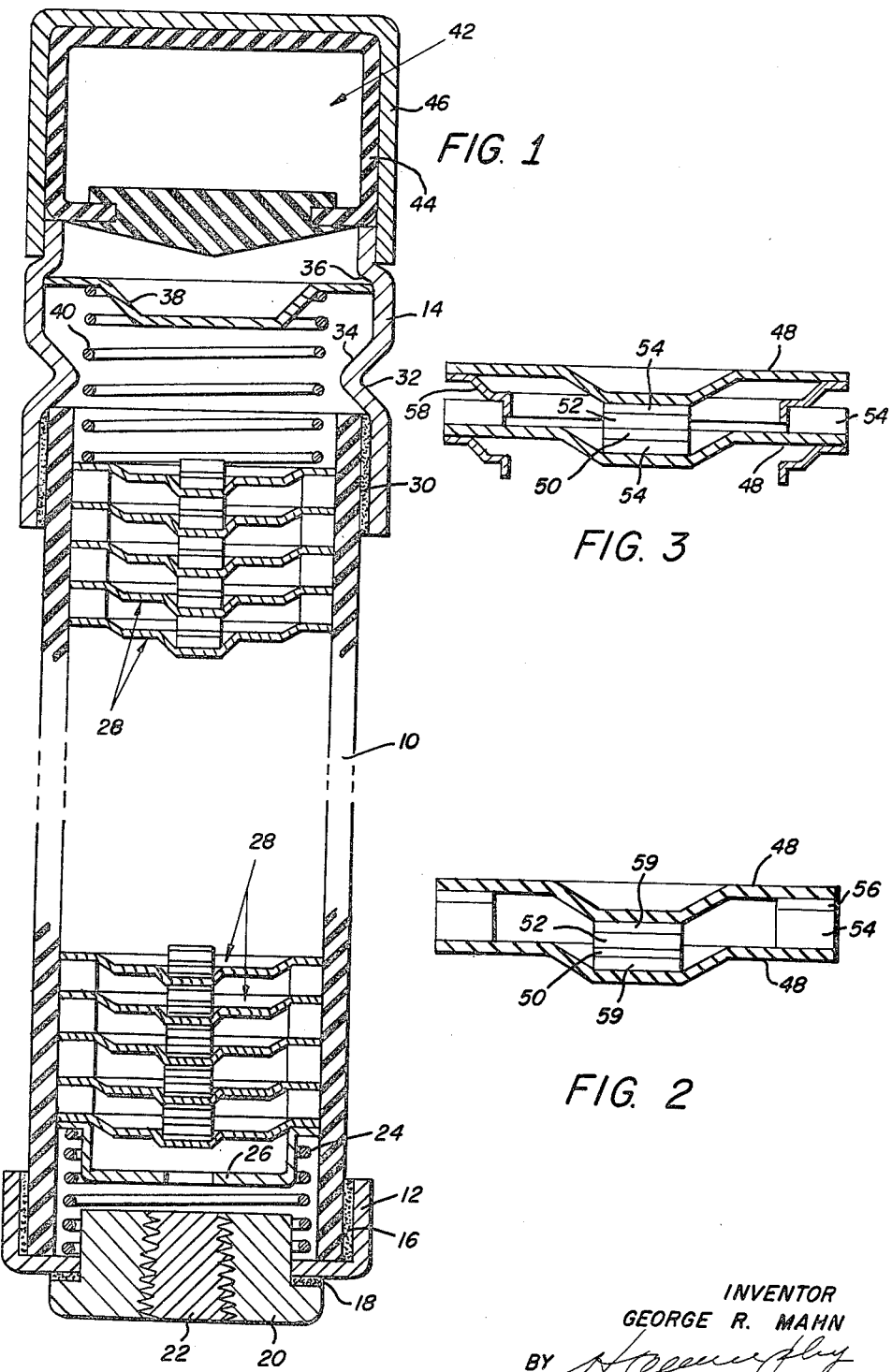

3,489,959
STACKED SILICON RECTIFIER ASSEMBLY
George R. Mahn, Stamford, Conn., assignor to The Machlett Laboratories, Incorporated, Springdale, Conn., a corporation of Connecticut
Filed Mar. 1, 1968, Ser. No. 709,601
Int. Cl. H01l 5/00, 9/00
U.S. Cl. 317—234                                  4 Claims

ABSTRACT OF THE DISCLOSURE

A stacked silicon rectifier assembly wherein capacitive reactance between cells is increased by the use therebetween of annular discs of high dielectric constant.

BACKGROUND OF THE INVENTION

High voltage solid state rectifiers are commonly made by series connecting low voltage cells in suitable insulated assembly to achieve the high inverse voltage rating desired. For example, approximately 250 individual, low-voltage silicon diodes, nominally rated at about 1000 volts, are electrically connected to produce a rectifier stack capable of withstanding peak inverse voltages of the order of 250 PKV, momentarily.

For successful operation, it is good design practice to minimize the inductive reactance of cells and connecting conductors, and maximize the capacitive reactance between cells. For the purpose of this description, it should be understood that the word "cells" is synonymous with "diodes." The reasons for this minimizing and maximizing practice are twofold. First, the transient voltage induced in the inductive reactance by rapidly changing current, such as might be caused by a gassy load tube, is proportional in magnitude to the inductance, viz., $e_i \alpha L\ di/dt$. Lower inductances produce lower self-induced voltages. Second, the capacitance between the cells tends to distribute the voltage across the cells proportionally. The capacitance between the cells should be approximately the same, cell to cell, and of much larger magnitude than distributed capacitances from individual cells to other elements in the electrical circuit.

In prior art structures of this type, such as disclosed in U.S. Patent No. 3,307,087, for example, the design of the cells or diodes is such that the inductive reactance is minimized. However, the dielectric between cells normally comprises silicone fluid, or a combination of silicone fluid and glass-melamine insulation, having a dielectric constant greater than 1. Such dielectric materials known to be used in devices of this character, however, have relatively low dielectric constants, usually between 2 and 3. Consequently, capacitance is also relatively low and, in fact, is so low as to degrade or cause premature failure of the devices when being used in many useful installations such as, for example, certain full wave rectified circuits for X-ray power supplies.

SUMMARY OF THE INVENTION

In accordance with the present invention, the capacitive reactance between cells is increased greatly by the use therebetween of annular discs of high dielectric constant, preferably of barium titanate ($BaTiO_3$), lead titanate, barium zirconate, lead zirconate or mixtures thereof, which materials may or may not be treated to enhance the piezoelectric properties.

BRIEF DESCRIPTION OF THE DRAWINGS

FIG. 1 is an axial sectional view of one assembly of the type contemplated by the invention;

FIG. 2 is a cross-sectional view of an individual diode cell and its supporting structure; and FIG. 3 is a cross-sectional view similar to FIG. 2 showing a modified cell-supporting structure.

DESCRIPTION OF THE PREFERRED EMBODIMENTS

Referring to the drawings, the stacked solid state rectifier assembly shown in FIG. 1 includes a dielectric body 10 of generally tubular shape having at one end an end cap 12 and at the other end a spring housing 14. Body 10 is preferably comprised of 96% vitreous alumina ceramic. End cap 12 and spring housing 14 are metal, preferably nickel, and are suitably fixed to the ceramic body 10 as by brazing to metallized surfaces (not shown) on the body by well-known brazing materials such as, for example, a silver-copper eutectic solder 16.

End cap 12 is annular in shape and is provided with a longitudinally flanged portion by which it is sealed to the body. Cap 12 also has an inwardly directed flange portion overlying the end of the body 10 to which is sealed, as by braze 18, a plug retainer 20 having a threaded longitudinally extending opening therethrough which receives a threaded plug 22.

Mounted within the adjacent end of the body 10 and encircling the inner end of plug retainer 20 is a compression spring 24, one end being seated in the end cap 12 and the other end forcibly abutting a stacking button 26. Button 26, in one form, has a dish-like shape with an annular bottom portion and a lip which provides adequate contact with spring 24 in order that suitable compressive forces may be applied to diode units 28 stacked within the body 10.

At the opposite end of the body 10, the spring housing 14 is secured to body 10 by means such as braze 30 and has a peripheral groove or depression 32 which provides an inner circumferential ridge 34 which functions to limit the extent of telescopic adjustment of the housing 14 on body 10 and permit it to seat squarely on the end thereof. Spaced outwardly from ridge 34 is a second inner circumferential ridge, ledge or shelf 36 upon which reposes a disc-like and slightly cupped spring retainer 38.

A second compression spring 40, similar to spring 24, is disposed between retainer 38 and the last of the stacked diode units 28, thus functioning with spring 24 to maintain the units in closely assembled contiguous stacked relation. Outwardly of the retainer 38 is an expansion unit 42 comprising, for example, an air-filled rubber bag or metallic bellows 44 which is disposed within a metallic housing or end cap 46. End cap 46 is attached to the spring housing 14 by any suitable means such as solder, braze or weld.

The ceramic body or housing 10 is filled with a suitable fluid such as the silicone fluid sold as Dow-Corning 200, or any insulating fluid having a dielectric constant greater than 1 and capable of conducting heat to the body 10. The dielectric constant of this fluid is preferably 2 or 2.5. The fluid may be inserted into the interior of the body 10 through the aperture normally filled by plug 22. The diode units 28 are shown more clearly in FIG. 2, and each comprises a flat metal disc 48, preferably stainless steel or the like, which has mounted thereon a silicon chip 50. Chip 50 is provided with a P-N junction and may be made by any well-known semiconductor fabrication technique. Disc 48, when used in the embodiment described in FIG. 1, may be a steel disc approximately ½ inch in diameter which preferably has a base nickel plate and a gold finish plate thereon. A contact 52, preferably comprising a silver disc, is mounted on the surface of the silicon chip 50. Lead solder 59 or the like may be used to conductively interconnect the silver contact 52 with chip 50 and with disc 48. The steel discs are slightly dish-shaped, as shown, and the outer edge portions thereof are spaced from one another by annular spacers 54 which, in accordance with this invention, are formed of high dielectric constant material such as barium titanate, lead titanate, barium zirconate, lead zirconate or mixtures thereof, which materials may, if desired, be suitably treated so as to enhance the piezoelectric properties thereof. To assure good electrical contact between the bases of the silicon diode cells and the barium titanate spacers 54, the discs preferably are silvered on their parallel surfaces, as indicated at 56 in FIG. 2. If desired, each steel disc may be provided on one side thereof with a circular metal spring washer 58, as shown in FIG. 3, for assisting in the maintenance of proper contact between each disc and the adjacent annular spacer. The spring 58 further assists in taking up clearance between the barium titanate spacers and the bases of the diode cells. Clearance must be present, of course, in order to insure positive contact between the diodes and the bases of the adjacent cells. Conversely, the resilient conductor, be it a silver coating, spring washer, or otherwise, may be between the diode and the adjacent base if an alternate construction is to be utilized wherein positive contact is made between the barium titanate discs and the adjoining bases.

The device described above is one whose mechanical structures, electrically speaking, provides a resistive-capacitive network in parallel with the rectifiers and further provides a stacked solid state rectifier assembly having little or no inductance. The assembly further has been found to have extremely long life and durability. Electrically, the device will rectify alternating current, yet because of the construction of the assesmbly, that is, the configuration of the diode cells 28 and the dielectric fluid and spacers 54, there is provided a capacitive and resistive effect in parallel with each individual diode cell whereby any voltage surge applied to the device tends to be evenly distributed among all the cells in the stack.

The device described in FIG. 1 when the tubing 10 is about 9 inches long and contains 170 diode cells whose individual breakdown voltage is 1000 volts or greater provides a 100 PKV rectifier stack. By either increasing the length or the individual cell breakdown voltage, higher voltage assembly stacks may be provided.

In accordance with the present invention, the barium titanate or similar high dielectric constant spacers 54 greatly increase the capacitance of a device of this character. For example, barium titanate has a dielectric constant of 1100-1500, a power factor of 2% maximum, and insulation resistance of about 100,000 megohms, and a typical rectifier embodying barium titanate spacers and rated at 150 PKV, inverse, may have 250 cells or diodes. The dielectric between cells will comprise the aforementioned silicone fluid or glass-melamine insulation. Assuming that the glass-melamine insulation is to be used and is displaced by the barium titanate and that the dielectric constants of the glass-melamine and the barium titanate are $K=2.7$ and $K=1000$, respectively, the increase in capacitance due to the barium titanate will be:

$$C = 0.0885(1000 - 2.7) \times \frac{1 \times 0.6}{0.052}$$

$$= 1000 \text{ micromicrofarads per cell}$$

From the foregoing it will be apparent that the capacitance of a stacked rectifier assembly of the character described may be increased several hundred times by the use of barium titanate spacers or by similar high dielectric constant spacers, as described. Moreover, the energy stored in such a capacitor is of the order of 0.04 to 0.06 joules at 150 PKV, an amount which has a considerable effect in smoothing or reducing the ripple factor, for example, in DC rectifier power supplies.

A barium titanate disc or spacer 54 .018 inch thick has a dielectric strength of $150 \times 18 = 2700$ v. DC, and a life test rating of 1800 v. at 85° C., and 1134 v. at 125° C. All of these values are safely above the normal voltage of 1200 v. per diode, and maximum voltage of 1700 v. per diode at room temperature.

From the foregoing it will be apparent that all of the objectives of this invention are achieved by the structure described above. It will also be apparent that certain modifications may be made by those skilled in the art without departing from the spirit of the invention as expressed in the accompanying claims.

What is claimed is:

1. A stacked rectifier assembly comprising a hollow dielectric body, a stack of rectifier components contained within said body, each component comprising a disc-like metal member, and a semiconductor junction device disposed on said metal member and having a contact in direct engagement with the next adjacent metal member in the stack, electrically resistive spacers interposed between said components, each spacer being of barium titanate and being in engagement with respective adjacent sides of two adjacent metal members, and a medium having a dielectric constant greater than 1 within said body and surrounding said components, said spacers increasing the capacitive reactance between components.

2. A stacked rectifier assembly as set forth in claim 1 wherein a resilient spring washer is positioned between each of said spacers and an adjacent metal member.

3. A stacked rectifier assembly comprising a hollow dielectric body, a stack of rectifier components contained within said body, each component comprising a disc-like metal member, and a semiconductor junction device disposed on said metal member and having a contact in direct engagement with the next adjacent metal member in the stack, electrically resistive spacers interposed between said components, said spacers being made of a high dielectric constant material selected from the group consisting of barium titanate, lead titanate, barium zirconate, lead zirconate, and mixtures thereof, and being in engagement with respective adjacent sides of two adjacent metal members, and a medium having a dielectric constant greater than 1 within said body and surrounding said components, said spacers increasing the capacitive reactance between components.

4. A stacked rectifier assembly comprising a hollow dielectric body, a stack of rectifier components contained within said body, each component comprising a disc-like metal member, and a semiconductor junction device disposed on said metal member and having a contact in direct engagement with the next adjacent metal member in the stack, electrically resistive spacers interposed between said components, each spacer being of a high dielectric constant material and being in engagement with respective adjacent sides of two adjacent metal members, a medium having a dielectric constant greater than 1 within said body and surrounding said components, said spacers increasing the capacitive reactance between components, and resilient means between each of said spacers and an adjacent metal member.

References Cited

UNITED STATES PATENTS 3,307,087   2/1967   Rogers et al. _____ 317—234

JOHN W. HUCKERT, Primary Examiner

R. F. POLISSACK, Assistant Examiner

U.S. Cl. X.R.

317—235